2 Sheets—Sheet 1.
G. P. REED.
Watch.
No. 510.
Reissued Nov. 24, 1857.
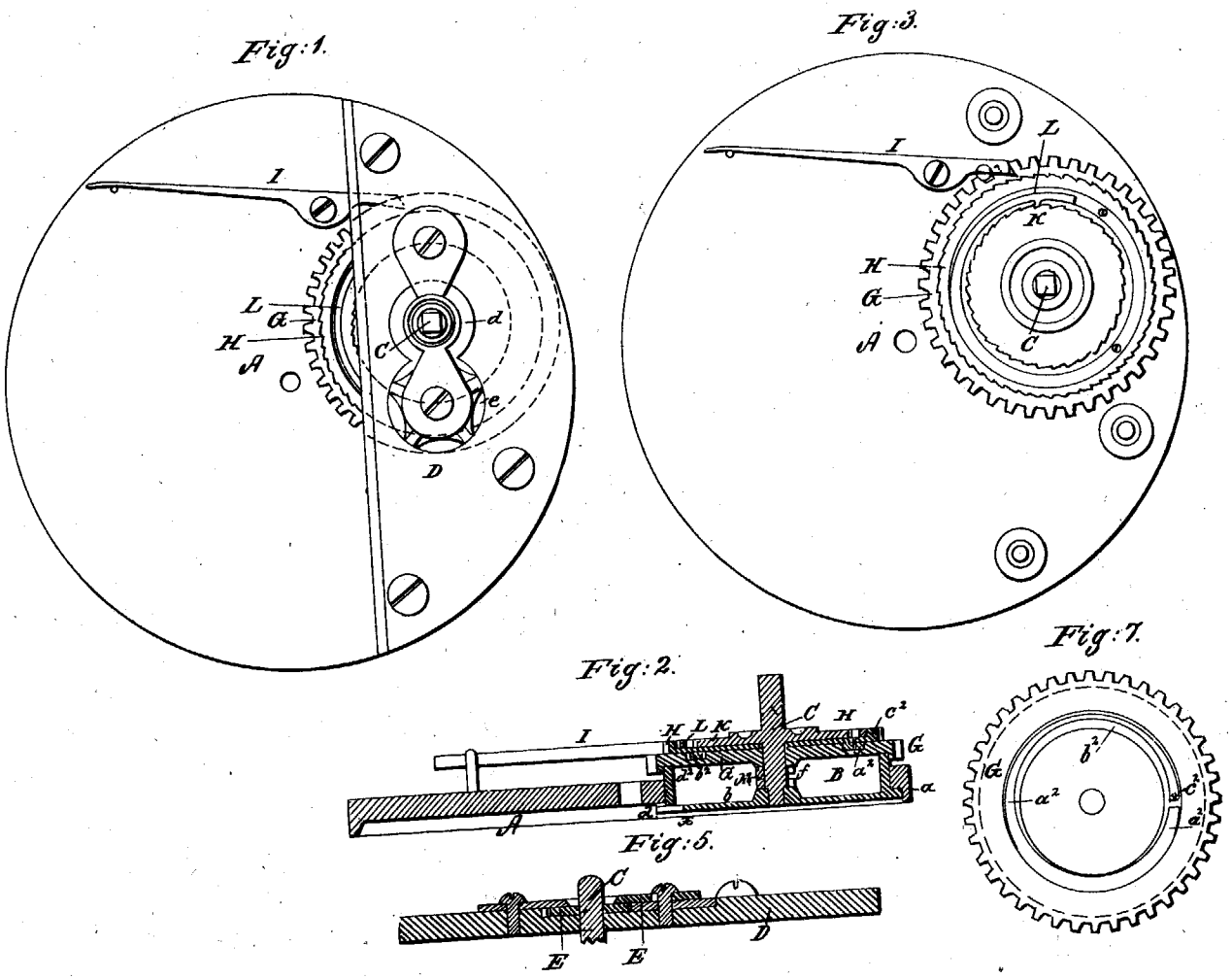
N. PETERS. Photo-Lithographer, Washington, D. C.

2 Sheets—Sheet 2.
G. P. REED.
Watch.
No. 510.
Reissued Nov. 24, 1857.
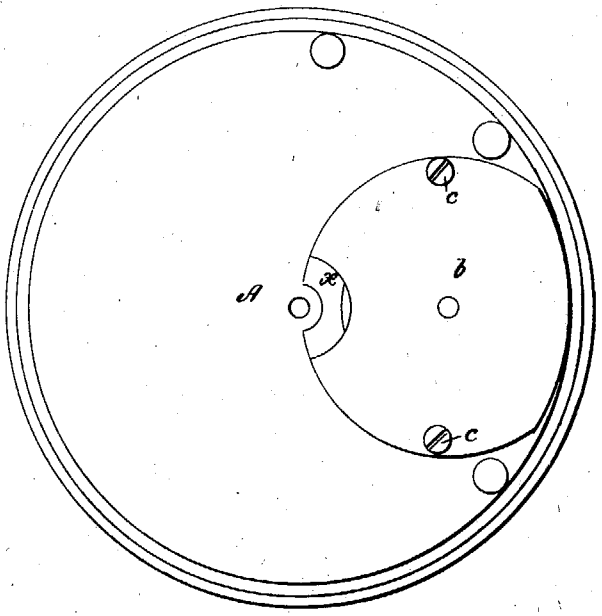
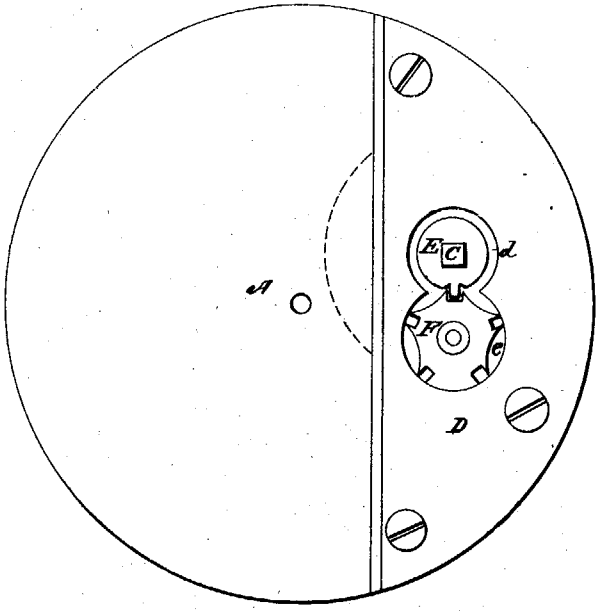
N. PETERS, Photo-Lithographer, Washington, D. C.

UNITED STATES PATENT OFFICE.

GEORGE P. REED, OF WALTHAM, MASSACHUSETTS.

IMPROVEMENT IN WATCHES.

Specification forming part of Letters Patent No. 17,055, dated April 14, 1857; Reissue No. 510, dated November 24, 1857.

*To all whom it may concern:*

Be it known that I, GEORGE P. REED, of Waltham, in the county of Middlesex and State of Massachusetts, have invented a new and useful Improvement in Watches; and I do hereby declare that the same is fully described and represented in the following specification and the accompanying drawings, of which—

Figure 1 exhibits the under side of a pillar-plate of a watch, and shows the bridge and mechanism applied to it, as will be hereinafter described. Fig. 2 is a transverse section of the said pillar-plate and the barrel for containing the mainspring, such section being taken through the centers of the said plate and barrel. Fig. 3 is a top view of the main gear, the retaining-power ratchet and pawl, and the winding or barrel-arbor ratchet and pawl. Fig. 4 is a top view of the stop-works. Fig. 5 is a vertical section of them and the bridge. Fig. 6 is a top view of the pillar-plate, all the parts of the different figures being drawn on a scale three times the usual size.

In the drawings, A denotes the pillar-plate and B the barrel for containing the mainspring, the latter not being represented in the drawings. This barrel is formed with a projecting flange, *a*, for the purpose of enabling it to be fastened to the pillar-plate, into and through which it extends, as shown in the drawings, the said pillar-plate being formed with a round hole having a diameter equal to that of the barrel and for the reception of the barrel.

In Fig. 6 I have shown a top view of the pillar-plate, such also representing the cap-plate *b* of the barrel. This cap-plate is made in one solid piece with the barrel, and both are secured in place by two screws, *c c*, extending through the flange *a a*, (which is an extension of the cap-plate,) and being screwed into the pillar-plate so as to confine the barrel to the pillar-plate.

C is the winding-arbor, which steps or is pivoted into the cap-plate *b*, and turns in a bridge, *d*, arranged parallel to and with respect to the pillar-plate, and fastened to it by posts. The stop-wheels E F are placed in sunken recesses made in the bridge-plate, as shown at *d e*.

G is the main gear, which is arranged so as to constitute a cap or bottom to the barrel. H is the ratchet of the maintaining-power; I, the spring-pawl of said ratchet; K, the arbor-ratchet, and L the spring-click thereof. A retaining-power, $a^2$, is applied to the winding-arbor and main gear, as will be hereinafter described, such being for the purpose of keeping the watch in motion while it is being wound up. The winding-arbor and main wheel are combined in essentially the same manner as the main wheel and common fusee of a watch, excepting that with regard to the part M of the winding-arbor which is within the barrel and around which the mainspring is coiled. It is stepped on the other portion of the arbor like a collar, and fastened there by a pin or key, *f*, such part serving both as a shoulder for the support of the main wheel and also to support the winding-arbor. The thickness of the part M should be such as to bring the main wheel just out of contact with the rim of the barrel, so that the said main wheel may turn freely and serve as a cover or bottom to the barrel.

The advantages of the above described arrangement of parts are as follows: As the barrel is stationary and the main wheel made to revolve with the winding-arbor, (such barrel, as watches are usually constructed, generally rotating with the main wheel while the winding-arbor is stationary,) there is no danger in case of breakage of the mainspring that the sudden and violent recoil of such spring will do injury to the train of the watch, as the arbor and ratchet under such circumstances are left free to turn backward without exerting any force on the main gear-wheel. In those watches having revolving barrels the reverse is the case, as the violent recoil of the spring often bends or breaks the teeth of the main wheel, as well as those of the other wheels of the train.

By arranging the barrel within the pillar-plate as described such barrel is so supported by such plate as to entirely prevent it from being burst open by such a recoil of the mainspring (an accident which frequently happens) when the barrel rotates and is arranged entirely outside of the pillar-plate. This arrangement also enables the watch to be made thinner, comparatively speaking, as while the watch is being wound up the winding-arbor rotates in one direction, and in the opposite as it runs down. I am enabled to employ a bridge and arrange the stop-works therein as described, the same enabling me to make the bridge as well as the stop-works so thick and strong as to prevent all liability of derangement of them. When the stop-works are arranged on the head of a rotary barrel in the usual way, it becomes necessary to make the same so thin that it has no substantial fastening and is liable to get out of order. When the force of winding is brought up by the stop-works, the extra force is exerted on the bridge and does not disturb the motions of the balance of the watch. The reverse of this is true when the barrel rotates, the extra force being exerted on the train and imparting to the balance an increased and unnatural motion. As the stop-works are exposed on the bridge, they constitute a good indicator of the time which may have elapsed since the watch was wound up. The lower barrel-head, *b*, is represented in Figs. 2 and 6 as formed with a sectoral recess or space *x*, for the reception of the dial-wheel gear or that wheel which operates the hour-hand of the watch. This recess enables the watch to be made thinner than would otherwise be the case. In consequence of applying the barrel to the pillar-plate in the manner described we are enabled to form the said barrel or its head *b* with such a recess, whereas, if the barrel rotated, the hour-hand wheel or gear would have to be arranged entirely above the barrel, and thus the watch, as a natural consequence, would have to be made thicker.

From the above it will be seen that one great advantage resulting from my improvement is the reduction of the thickness of the watch.

Fig. 7 is an inside view of the main gear-wheel, showing the retaining or maintaining power spring, $a^2$, as arranged in an annular recess, $b^2$, formed in the said wheel. In this figure the loose end of the spring is shown as provided with a small projection, $c^2$, which, when the wheel is in place, extends into a corresponding hole made in the retaining or maintaining power ratchet, H, and thus connects such ratchet with the said spring.

In the use of the fixed barrel, as the barrel-arbor is turned in one direction while the watch is being wound, and in the opposite direction while the watch is running or in operation, it becomes necessary, in some way, directly to apply to such barrel the retaining or maintaining power, for, unless the same is effected, the watch will be liable to stop while it is being wound up. In order to obviate this difficulty I have made use of the same kind of retaining-power which is employed in the common fusee-watch, and this I have applied directly to the fixed barrel, as above explained or exhibited. In applying the retaining-power to the fixed barrel in the manner shown, such differs from the application of it to a common fusee. In both cases the retaining-power spring is bent or receives its force from the mainspring of the watch. In the fusee it receives such power by means of a chain which runs from the outside of a moving barrel (which contains the mainspring) to the outside of the fusee-wheel.

In my application of the retaining-power to the fixed barrel, the retaining-power spring receives its force directly from the barrel-arbor around which the mainspring is coiled.

What therefore I claim is—

1. The arrangement of the barrel in respect to the pillar-plate so that it shall extend through the plate and be fastened to the dial side of it.

2. Arranging the main gear-wheel with the retaining-power and barrel-arbor so that the said wheel shall serve the purpose of a barrel-head or cover to the barrel.

3. The application of the retaining-power directly to the fixed barrel, substantially as specified.

Witnesses: GEO. P. REED.

R. H. EDDY,

F. P. HALE, Jr.